April 5, 1955        R. C. FRITZSCH        2,705,501

NON-REPEAT VALVE

Filed April 9, 1953

INVENTOR.
RALPH C. FRITZSCH
BY
ATTORNEYS.

United States Patent Office 2,705,501
Patented Apr. 5, 1955

2,705,501

NON-REPEAT VALVE

Ralph C. Fritzsch, Cincinnati, Ohio, assignor to The Cincinnati Shaper Co., Cincinnati, Ohio, a corporation of Ohio Application April 9, 1953, Serial No. 347,799

5 Claims. (Cl. 137—112)

This invention relates to a non-repeat valve. There are many hydraulic and pneumatic applications where the valve of the present invention will find utility. It has particular utility in connection with pneumatic controls for such machines as press brakes. Such an application is described and claimed in my co-pending application, Serial No. 347,798, filed April 9, 1953.

In said copending application, I have described a control for the ram of a press brake wherein the ram is moved during a part of its cycle at least in direct proportion to the actuation of a manual or pedal regulating valve. I have also described how a valve may be operated by a cam on the eccentric shaft to operate a valve at the bottom and at the top of the stroke of the ram.

In certain operations it is desirable that when the manual or pedal regulating valve is actuated, the ram passes through a complete cycle and stop at the end of the cycle even though the operator may have neglected to let go of the actuator for the regulating valve.

It is, therefore, an object of the present invention to provide a valve useful in a circuit as above outlined which may perform a non-repeat function. Thus, it is an object of the invention to provide a valve which, having once operated, will not accidentally repeat its operation.

It is another object of the invention to provide a valve having two inlets and one outlet and containing valve elements positioned to normally connect one of said inlets to the outlet and to provide means whereby the valve is shifted by the application of pressure to the second inlet to a position in which the second inlet is connected to the outlet.

In this connection, it is a further object of the invention to provide a valve such that when it has once been shifted as above outlined, it cannot shift back to its initial or normal position unless both of the inlets are exhausted.

In this connection, it is yet another object of the invention to provide such a valve which will remain in shifted position even though either one of said inlets is exhausted.

These and other objects of the invention which I shall point out in more detail hereinafter or which will be apparent to one skilled in the art upon reading these specifications, I accomplish by that certain construction and arrangement of parts of which I shall now describe an exemplary embodiment.

Reference is made to the drawings forming a part hereof and in which.

Figure 1:
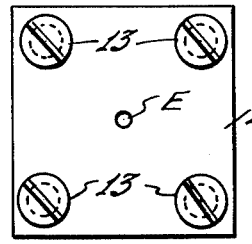
Figure 1 is an elevational view of the valve as seen from the left end of Figures 3 and 4.
Figure 2:
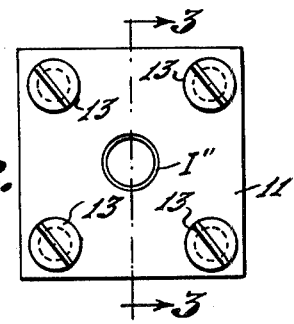
Figure 2 is an elevational view of the valve as see from the right end of Figures 3 and 4.

Briefly, in the practice of my invention I provide a body indicated generally at 10. The body may be closed at its ends by the heads 11 and 12 which may be secured to the body by screws 13 as shown. The head 11 is provided with a port or opening I″ which may be provided with a pipe thread as shown. The head 12 is provided with a small exhaust aperture E.

Internally, the body 10 has a portion of relatively larger diameter indicated at 14 which is hereinafter sometimes referred to as a spring chamber and a portion 15 of relatively smaller diameter which is hereinafter sometimes referred to as the valve chamber. The chambers 14 and 15 are in communication with each other.

The valve chamber 15 is provided with a port I′ and a port O, the port I′ being an inlet port and the port O being an outlet port.

Within the valve body I provide a structure comprising a piston 16, a stem 17 and the valve elements 18 and 19. The members 16, 17, 18 and 19 may be integral or rigidly secured together. The valve elements 18 and 19 are preferably provided with the O-rings 20 and 21 to provide for sealing engagement with the walls of the valve chamber 15. The piston 16 is preferably provided with an O-ring 22 seated in an annular groove 23 in the piston. A very fine bleeder hole 16a is provided through the piston 16 for a purpose described hereinafter. This hole will be about the size produced by a No. 60 drill.

Figure 3:
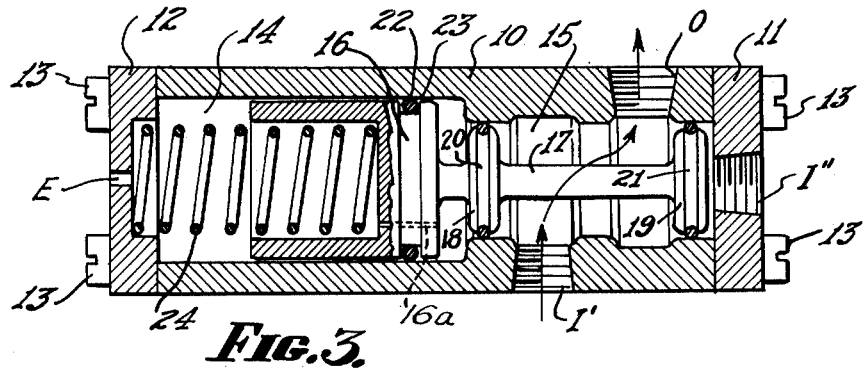
Figure 3 is a cross sectional view of the same taken on the line 3—3 of Figure 2 showing the parts in a normal position.

In order to conserve space, the piston 16 may be of the skirt type as shown and a compression spring 24 bears at one end against the spring chamber head 12 and at the other end against the piston 16 to hold the parts normally in the position of Figure 3.

In the position of Figure 3, it will be observed that the inlet I′ and the outlet O are in communication. These openings are between the valve elements 18 and 19 and as long as the opening I″ is open to exhaust, the valve remains in the position of Figure 3. The air pressure applied at I′ bears with equal force against the inner faces of the valve elements 18 and 19 and provides no axial component.

Figure 4:
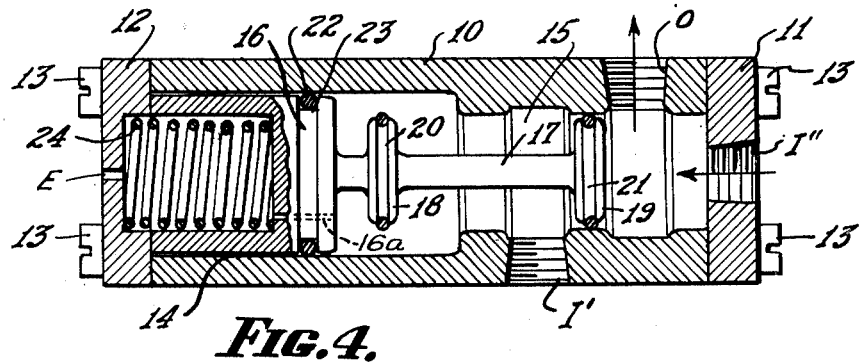
Figure 4 is a view similar to Figure 3 showing the parts in shifted position.

If now pressure is supplied to the inlet I″, the valve shifts to the position of Figure 4. The pressure from I″ against the valve elements 19 is sufficient to overcome the force of the spring 24 and since the pressure at I′ has no axial component, the assembly 16, 17, 18, 19 is moved to the left. This of course is true whether any pressure is supplied at I′ or not.

After a very short travel toward the left of Figure 3, the O-ring 20 clears the wall of the valve chamber 15 and enters the spring chamber 14 so that if pressure is being supplied at I′ this pressure will now act upon the piston 16 over a larger area than the valve element 19 so that pressure at I′ assists in moving the valve elements to the left. If no pressure is being supplied at I′, the pressure at I″ is still sufficient to produce the move.

The movement to the left continues until the position of Figure 4 is attained in which the inlet I′ is cut off from the outlet O although still in communication with the spring chamber 14, and the inlet I″ is now in communication with the outlet O.

In the position of Figure 4, as long as pressure is applied to either of the inlets I′ or I″ the valve remains in this position. For example, if I″ is exhausted to atmosphere the pressure of I′ is still applied against the piston 16 and the valve remains in the position of Figure 4. If, on the other hand, I′ is exhausted to atmosphere, the pressure from I″ still bears against the valve element 19 and holds the structure in the position of Figure 4. Thus, the valve will not and indeed cannot return to the position of Figure 3 until both inlets I′ and I″ are exhausted to atmosphere.

The exhaust opening E prevents build-up of pressure behind the piston 16 so that the only force to be overcome by pressure from I′ or I″ is the spring 24. This spring will of course be designed in the light of pressure encountered in the fluid circuit.

Upon return movement of the valve to the position of Figure 3, the entry of the O-ring 20 into the chamber 15 would produce a pressure block which would prevent complete return of the valve. The bleeder hole 16a prevents this pressure build-up, and insures that the valve will return fully to the position of Figure 3.

While the valve has been described primarily in its application to the control circuits of my said co-pending application, it will be understood that it will find utility in many other situations.

It will also be clear that many modifications may be made in details of structure and arrangement without departing from the spirit of my invention.

I therefore do not intend to limit myself in any manner other than as set forth in the claims which follow.

Having now fully described my invention, what I claim as new and desire to secure by Letters Patent, is:

1. A valve having two inlets and an outlet, a valve element shiftable from a position connecting one of said inlets with said outlet to a position connecting the other of said inlets with said outlet, and having yieldable means to normally hold it in said first position, and means operative in said shifted position to hold said valve element in shifted position even though the other of said inlets is exhausted, and means comprising a part of said valve element to hold said valve element in shifted position even though said one of said inlets is exhausted, whereby said valve element cannot return to said first position until both inlets are exhausted.

2. A valve having a chamber open at one end and having two valve elements therein, said valve elements being secured together in spaced relation, a first inlet, an outlet, and a second inlet, spaced axially of said chamber, yieldable means to normally hold said valve elements in a position in which one of them is disposed between said outlet and said second inlet, and the other is disposed beyond said first inlet toward the open end of said chamber, said valve elements being shiftable by pressure applied to said second inlet to a position in which said one of said valve elements is disposed between said outlet and said first inlet, and the other is moved out of said chamber, said one of said valve elements holding said valve elements in shifted position even though said first inlet is exhausted, and means for holding said valve elements in shifted position even though said second inlet is exhausted.

3. A valve having a chamber open at one end and having two valve elements therein, said valve elements being secured together in spaced relation, an inlet and an outlet opening in said valve chamber between said valve elements, and a second inlet opening in said valve chamber beyond said valve elements at the closed end of said valve chamber, and yieldable means to normally hold said valve elements in a position wherein said inlet and outlet openings between the valve elements are in communication, a cylinder communicating with said valve chamber at its open end, a piston in said cylinder, said piston being secured to said valve elements and having a larger area than said valve elements, and a bleeder hole in said piston, whereby upon application of pressure to said second inlet said valve elements are shifted to put said second inlet in communication with said outlet and to put the other inlet into communication with said cylinder, and whereby said valve remains in shifted position until both inlets are exhausted.

4. A valve comprising a body having a spring chamber of larger diameter and a valve chamber of smaller diameter axially aligned and in communication with each other, a piston having a bleeder hole in said spring chamber and a spring to urge said piston to a normal position adjacent said valve chamber, a stem secured to said piston and extending into said chamber, a first valve element mounted on said stem adjacent the communicating end of said valve chamber, and a second valve element mounted on said stem adjacent the other end of said valve chamber, both in normal position of said piston, a first inlet in said valve chamber between said valve elements adjacent said first valve element, a second inlet in said valve chamber beyond said second valve element toward the closed end of said valve chamber, and an outlet in said valve chamber between said valve elements adjacent said second valve element, and an exhaust opening in said spring chamber, whereby said first inlet and outlet are normally in communication, said valve being shifted by application of pressure to said second inlet, to place said second inlet into communication with said outlet and to block said first inlet from said outlet and place it in communication with said spring chamber, and whereby, once shifted, said valve will not return to normal position until both said inlets are exhausted.

5. A valve comprising a body having a spring chamber of larger diameter and a valve chamber of smaller diameter axially aligned and in communication with each other, a spring chamber head and a valve chamber head, a piston having a bleeder hole in said spring chamber and a spring between said piston and spring chamber head to urge said piston to a normal position adjacent said valve chamber, a stem secured to said piston and extending into said valve chamber, a first valve element mounted on said stem adjacent the communicating end of said valve chamber, and a second valve element mounted on said stem adjacent the valve chamber head, both in the normal position of said piston, a first inlet in said valve chamber between said valve elements adjacent said first valve element, a second inlet in said valve chamber head, and an outlet in said valve chamber between said valve elements adjacent said second valve element, and an exhaust opening in said spring chamber head, whereby said first inlet and outlet are normally in communication, said valve being shifted by application of pressure to said second inlet, to place said second inlet into communication with said outlet and to block said first inlet from said outlet and place it into communication with said spring chamber, and whereby, once shifted said valve will not return to normal position until both said inlets are exhausted.

References Cited in the file of this patent

UNITED STATES PATENTS

| 932,887 | McDaniel | Aug. 31, 1909 |

FOREIGN PATENTS

| 990,320 | France | Sept. 20, 1951 |